March 23, 1943.  C. SCHOUTEN  2,314,428
JIG FOR TREATING ORE BEARING AND LIKE MATERIALS
Filed July 22, 1940   3 Sheets-Sheet 1

Inventor:
C. Schouten
By E.F. Wendroth
atty

March 23, 1943.  C. SCHOUTEN  2,314,428
JIG FOR TREATING ORE BEARING AND LIKE MATERIALS
Filed July 22, 1940.  3 Sheets-Sheet 2

March 23, 1943. C. SCHOUTEN 2,314,428
JIG FOR TREATING ORE BEARING AND LIKE MATERIALS
Filed July 22, 1940 3 Sheets-Sheet 3

Inventor:
C. Schouten,
By E. F. Wenderoth
atty

Patented Mar. 23, 1943

2,314,428

UNITED STATES PATENT OFFICE 2,314,428

JIG FOR TREATING ORE-BEARING AND LIKE MATERIALS

Cornelis Schouten, Delft, Netherlands; vested in the Alien Property Custodian

Application July 22, 1940, Serial No. 346,851
In Great Britain June 15, 1939

10 Claims. (Cl. 209—455)

The invention relates to jigs for treating ore-bearing and like materials, for example alluvial, eluvial or crushed primary ores and like materials. More particularly, this invention is concerned with pulsator jigs in which the necessary pulsations are generated by intermittently supplying liquid under pressure to the hutch, or to each of a number of hutches, through a valve device inserted in a pressure feed line constantly maintained under pressure.

In known constructions, the valve device is operated in such a way as intermittently to open and to entirely close the supply line thereby producing an intermittent feed of pressure liquid from the pressure feed line. In one such known construction, the pressure feed line with a rotary sleeve valve therein is connected via the valve casing, by a number of separate pipes to a number of independent jig compartments. The valve is constructed and arranged so that the ports in the valve casing open and then completely close during the rotation of the valve. An air vessel is provided in the feed line so that when the ports close the consequent checking of the momentum of the falling water causes the water to rebound into the air chamber; in this way the intensity of the water-shocks which inevitably arise due to closing of the valves is reduced. Complete closing of the valve ports results in complete stoppage of liquid flow in the supply line at the moment of closure (hence the necessity for the air vessel), but a further result is that the whole of the mass of water in the supply line must be re-accelerated again after re-opening of the ports, and that not only entails loss of energy but it also takes time, so that the pulsation of liquid does not commence as suddenly as it would have done, had the liquid not required such time for regaining its normal flowing velocity. Moreover, the necessity for an air vessel in such jigs is disadvantageous per se. The known jigs are of limited application and cannot satisfactorily be used for the treatment of material which contains the heavier material in relatively substantial quantity as very small particles, i. e. in finer sizes, e. g. when it is not closely sized, or is not sized at all, or is hydraulically classified. Separation of such finer material requires sudden, shock-like pulsations.

The object of this invention is to improve the operation of the jigs of the kind referred to.

According to the present invention, a jig for treating ore-bearing and like materials of the kind in which pressure liquid is intermittently supplied to a hutch, or to each of a series of hutches, from a pressure feed line provided with an intermittently or continuously operated valve mechanism adapted to produce pulsations in said hutch or hutches, is characterised in that the valve mechanism is provided with a plurality of discharge ports and is so constructed and arranged that, in operation, an uninterrupted flow of liquid discharges from said pressure feed line. Suction effect (downward movement or surge of the liquid through the sieve) is only possible in known jigs by keeping the hutch gate or valve open (that is to say by causing a constant discharge from the hutch, e. g. in the Richards pulsator jig) or as a consequence of the return of suddenly generated pressure waves which occurs in pulsator jigs of the Pan-American type in which the valve is of the poppet variety.

The invention renders it possible to provide a fixed and predetermined ratio between the duration of the pulsations of, and that of periods of rest in, the water contained in the jig or jig compartments. It will be understood that the expression "period of rest" indicates a period in which the water is subjected neither to pulsation nor to suction. Furthermore, it is now possible to provide a certain ratio between the duration of one or both of the said periods and the duration of a suction period; when suction is desired. In other words, a controlled suction period can be obtained.

It is furthermore possible in accordance with the invention to regulate or adjust the ratio referred to within rather wide limits to suit given different circumstances of jigging, or to suit different kinds of material to be treated. In this way—with the pulsation and rest (and in some cases also suction) periods exactly adjusted one to the other—it becomes possible satisfactorily to treat material which is not closely sized, or not sized at all, or which is hydraulically classified and hence contains the heavier material in relatively finer sizes.

Preferably, the jig of the present invention comprises at least two jig compartments of which the respective hutches are connected to separate discharge ports of the valve mechanism. However, advantage over known constructions is obtained even when the invention is applied to a jig having but one hutch. In this case, the valve is provided with two discharge ports, one of which is connected with the hutch and the other (preferably of smaller capacity) is connected to the main discharge or drain. While the pressure liquid drawn off through this second connecting pipe represents a certain amount of lost energy, the arrangement has the advantage of permitting an uninterrupted flow of liquid from the pressure feed line (thus obviating water-shocks and therefore the necessity for an air vessel in the pressure feed line) and furthermore the liquid drawn off can be recirculated to the pressure feed supply. Again, this loss of energy is substantially offset by the fact that—as compared with the known constructions—energy, which would otherwise be lost in overcoming the inertia of the mass of liquid in the feed line on the opening of a valve hitherto closed, is now saved. The invention presents the advantage that it is possible thereby to bring about pulsations which act more suddenly and more violently and enables a flexibility of control (which is more particularly apparent in jigs according to the invention which comprises two or more jig compartments) whereby the action of almost all known types of jigs can be imitated, but with added advantages, and a greater variety of materials can be treated as compared with any one type of known jig.

The invention is illustrated, by way of example only, in the accompanying drawings, in which.

Figure 1:
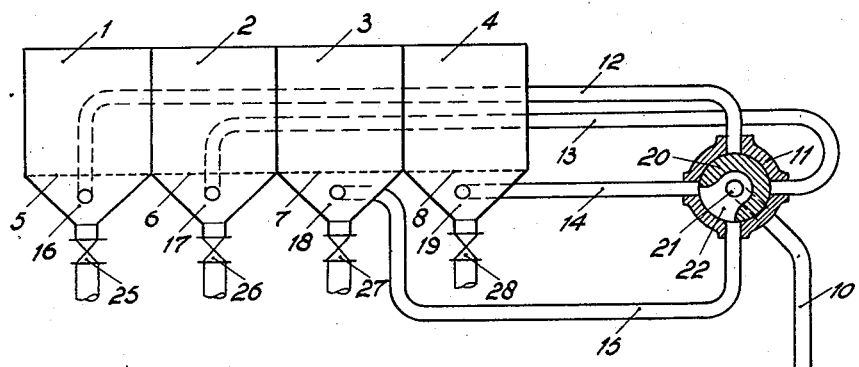
Figure 1 illustrates diagrammatically a jig plant comprising four jig compartments employing pulsation only.

Referring to Figure 1 of the drawings, the four jig compartments are indicated by the numerals 1, 2, 3 and 4. Each of them is provided with the usual sieve 5, 6, 7 and 8 respectively. The material to be treated is carried by the said sieves and is supplied in a substantially horizontal direction so that it passes over the sieve surfaces. At the same time top-water is supplied with the material above the sieves. All this is well known to those skilled in the art.

Pulsations are exerted on the mass of material to be treated and on the water in the spaces above the sieves, i. e. in the jig compartments, these pulsations being always exerted by means of pressure water suddenly and intermittently forced upwardly through the sieve either by means of pistons, or by a valve opening in a pressure liquid supply line or by other means. Due to this, the heavier minerals are concentrated in the lower layers of the bed of material, immediately above the sieve, or pass through a bottom bed and through the sieve to the hutch, whereas the lighter substances are lifted by the upwardly directed stream of water to a greater extent and may be discharged in the form of tailings with the superfluous water, e. g. in a horizontal direction.

It would appear to be important for an efficient separation that the pulsations shall be exerted suddenly, that is to say without the slow acceleration produced by pistons. Moreover, it has been found that the action of a jig can be improved when a pulsion period is followed by a period of rest in which no vertical movement of the water occurs and therefore in which the material is allowed to settle. In most known jigs, such a rest period is not obtained. For example, in the Harz jig the rest period is not obtained since the reciprocating piston has a continuous action. When a rest period does occur in the operation of known jigs it is only of relatively short duration, as this is somewhat of the same order as the duration of the periods of pulsion. According to the present invention, it is possible, and in many cases desirable, dependent upon the kind of material to be treated, to arrange that the suction period is three, four or even more times the duration of a pulsion period.

In Figure 1 the pressure liquid is supplied through the feed line 10 and distributed by means of the valve device 11 to four lines (flexible or other tubes) 12, 13, 14 and 15, thence to the hutches 16, 17, 18 and 19 of the jig compartments 1, 2, 3 and 4 respectively. The valve device 11 is so constructed that the different hutches are successively supplied with liquid under pressure exerting the desired pulsion, the valve device 11 being designed, however, so as to prevent any complete closure of the feed line 10. This means that one of the distributing lines 12, 13, 14 or 15 is not closed before another is opened at least partly, with the result that an uninterrupted, though not necessarily constant, flow of liquid passes through the tube 10. After being opened for a certain length of time, each of the tubes 12, 13, 14 or 15 is closed for a longer time and it will be understood that the ratio between these periods can be varied by changing the form of the ports, or their distribution along the periphery of the casing, or the rotor of the valve device 11.

The rotor 20 in the valve device 11 is rotatable on a shaft 21 which is preferably driven mechanically as through a pulley or the like. The rotor 20 may, however, be driven by means of the pressure liquid itself, either directly or by means of a separate supply branched off from the main stream in the tube 10.

The tube 10 is so connected to the valve device 11 as to enable the liquid to enter the hollow space 22 within the rotor freely in all positions of the rotor. The said hollow space 22 alternately opens and closes the ports leading to the tubes 12, 13, 14 and 15 when the rotor is rotating, but at no time are all of the ports entirely closed; in other words, at least one of the ports is open, either partly or completely, at any point in the cycle.

The hutches 16, 17, 18 and 19 are provided with the usual hutch valves or cocks 25, 26, 27 and 28, through which the materials passing through the sieves 5, 6, 7 and 8 can be discharged. Said valves may also be kept opened to some extent during operation with the result that part of the effect of each pulsion is lost, but nevertheless, in what would otherwise be periods of rest a certain suction effect is exerted on the jig compartments in a downward direction.

Figure 2:
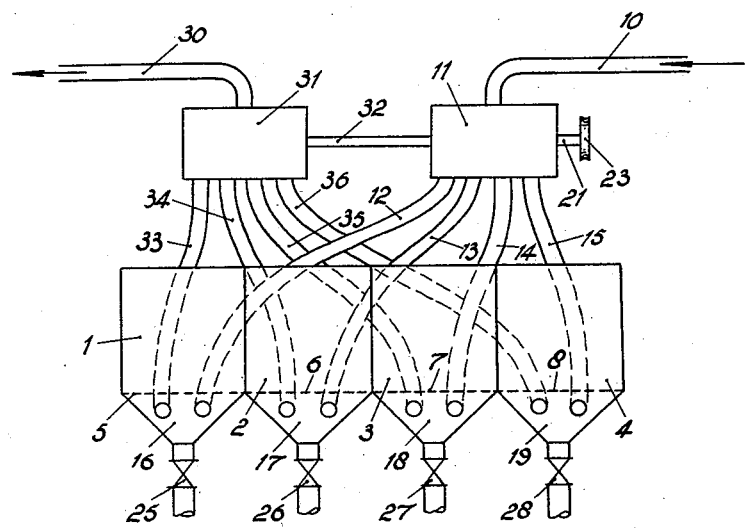
Figure 2 shows a similar arrangement for a device employing pulsation and suction.

In the arrangement shown in Figure 2, the hutches 16, 17, 18 and 19 of four jig compartments 1, 2, 3 and 4 are also connected by means of flexible tubes 12, 13, 14 and 15 to a pressure liquid distributing valve device 11, fed from a supply 10, in the same manner as the jig of Figure 1. The rotor in the valve device 11 can be kept in constant rotation by means of a pulley 23 on a shaft 21.

Furthermore, however, according to Figure 2 a main suction line 30 is arranged in communication with a suction distributing valve device 31. In principle the device 31 is of the same design as the device 11 and is driven at the same speed, by means of the intermediate shaft 32. Of course, the devices 11 and 31 may be combined into one unit.

The valve device 31 is connected by means of the flexible tubes 33, 34, 35 and 36 to the hutches 16, 17, 18 and 19. In this way, a suction effect is exerted in the jig compartments during certain exactly adjusted periods, preferably after a period of rest following a pulsation period. For treating certain materials such a period has a very good influence on the working efficiency of the jigs. Of course the suction periods are not only in timed relation with the pulsation and rest periods, but also may be chosen in respect to both, in order to provide an optimum suction duration. If desired, the suction valve device 31 can be omitted, in which case the tubes 33, 34, 35 and 36 would be connected to a drain and a constant suction effect obtained.

Figure 3:
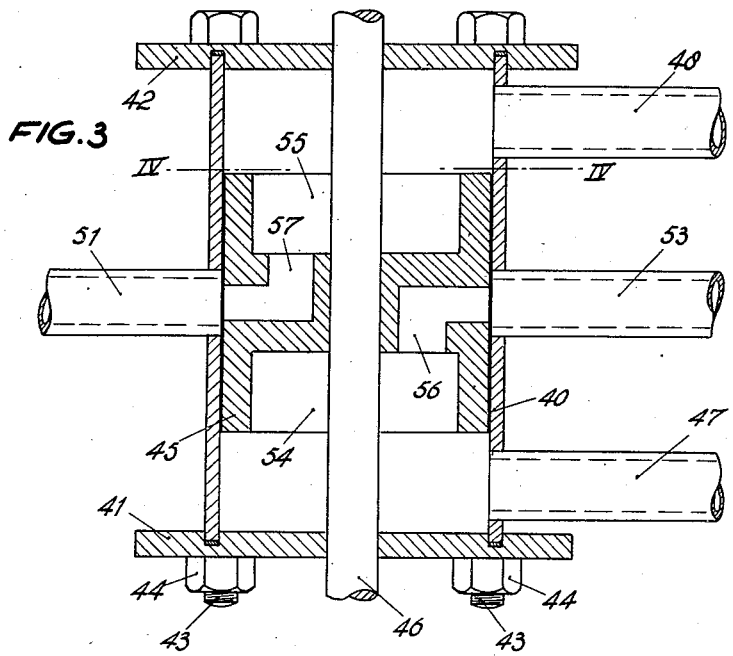
Figures 3 and 4 are axial and cross sections of a modified form of a valve device used according to the invention.
Figure 4:
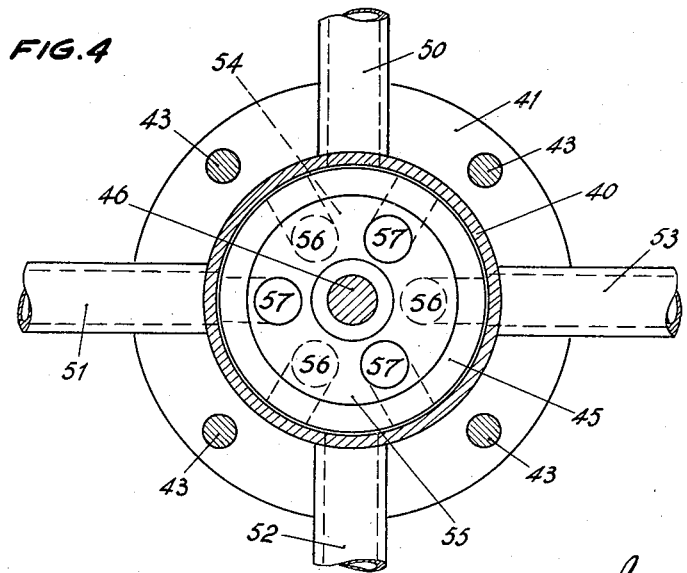

In Figures 3 and 4 a constructional embodiment of a combined pressure and suction valve device according to the invention is illustrated. The casing is formed by the cylinder 40 provided at both ends with cover plates 41 and 42, secured together by means of bolts 43 threaded to receive nuts 44. Within the casing 40 is a rotor 45 keyed to a shaft 46 passing through the casing 11 and driven by any convenient source of power.

The casing 11 is provided with several connections. At 47 is the connection to the pressure feed line and at 48 the connection to the suction line. The connections 50, 51, 52 and 53 are for distributing lines to four jig compartments serving at the same time, but intermittently, for transmitting pulsions and suctions to these respective compartments.

The rotor 45 is provided at each end face with a chamber 54 and 55 respectively which are in free communication with the pressure and suction connections 47 and 48 respectively. Leading from the chamber 54 there are three passages 56 and from the chamber 55 three passages 57, all of which lead to ports in the periphery of the rotor opposite the ports corresponding to the connections 50, 51, 52 and 53. It will be understood that when the rotor 45 is revolved, each of the tube connections 50, 51, 52 and 53 will be alternately connected to the pressure feed line 47, closed completely and connected to the suction line. The distribution of the ports 56 and 57 along the periphery of the rotor 45 or the position of the connections 50, 51, 52 and 53 on the casing 40 and also the shape of those ports, determine the nature and the mutual relation of the pulsions, the suctions and the period of rest in each jig compartment.

Figure 5:
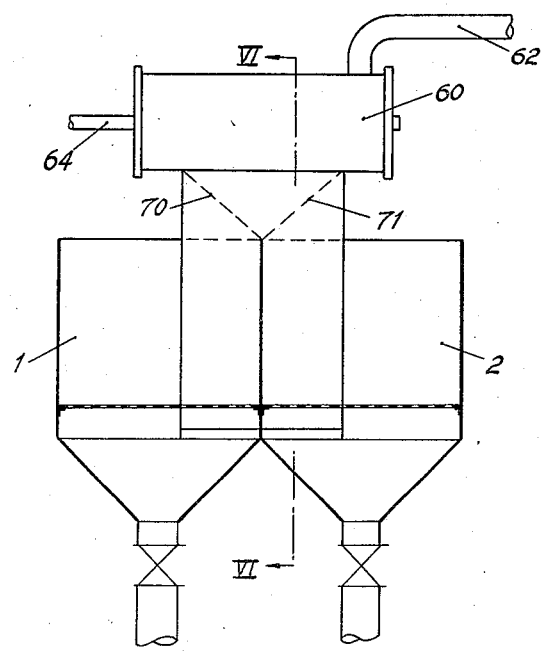
Figures 5 and 6 are elevational sections, taken at right angles to each other, of another jig plant comprising a modified form of valve device. The same references are used for corresponding parts throughout the several views.
Figure 6:
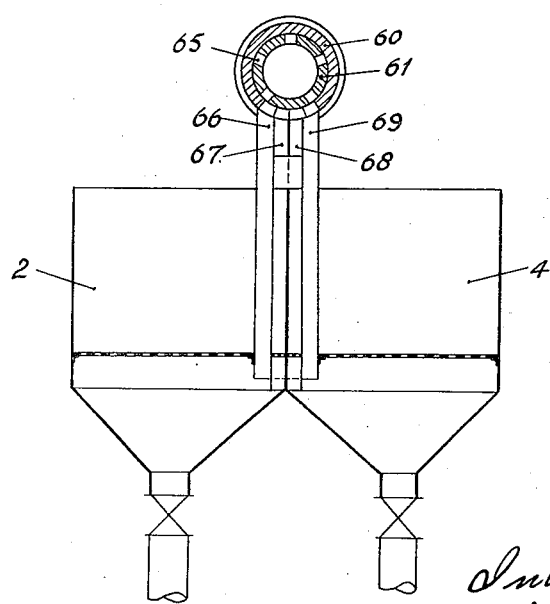

In the arrangement according to Figures 5 and 6 four jig compartments are situated in two rows each comprising two compartments. The compartments themselves need no further description. Above the compartments a valve device 60 comprising a rotor 61 is mounted and is connected to a pressure feed line 62. For convenience the embodiment is limited to a controlled pulsation action; in other words suction is left out of consideration. The rotor 61 is rotated by means of the shaft 64.

The rotor 61 is provided at its periphery with, for example, five ports 65, passing successively four ports 66, 67, 68 and 69 in the valve casing. The latter ports are all arranged one almost immediately adjacent the other. The arrangement is such that at no time are all of the ports 65 closed so that liquid will continuously enter the device 60 through the line 62.

The connections 66, 67, 68 and 69 are in the form of "flat" passages, each extending across the major portion of one wall of a jig compartment and having a relatively narrow width, these passages extending below the sieve in open communication with the respective hutches so as to distribute the exerted pulsation pressure uniformly over the entire area of the sieves. For the sake of clearness it should be mentioned that the dotted line 70 indicates in Figure 5 the left-hand end walls of the passages 66 and 69 connected to the jig compartments 2 and 4, whereas the dotted line 71 in the same figure indicates the right-hand end walls of the passages 67 and 68 leading into the compartments 1 and 3.

What I claim is:

1. A jig of the character described, comprising a jig compartment, a pressure liquid feed line, a valve mechanism associated with said feed line, a supply conduit directly connecting the said jig compartment to a discharge port of the said valve mechanism and means for constantly operating said valve mechanism, the said jig compartment comprising a perforated screen dividing same into a sluice compartment and a hutch, said hutch having rigid walls, thus a constant capacity and being provided with a discharge valve at the bottom, the said valve mechanism being provided with a plurality of discharge ports including the aforementioned one and being so constructed and arranged that when operated by its operating means an uninterrupted flow of liquid discharges from said pressure feed line, whereas periodical sudden pulsations are generated in the said hutch.

2. A jig of the character described, comprising a plurality of jig compartments, a pressure liquid feed line, a valve mechanism associated with said feed line, supply conduits directly connecting each of the said jig compartments to a different one of a plurality of discharge ports of the said valve mechanism and means for constantly operating said valve mechanism, the said jig compartments each comprising a perforated screen dividing same into a sluice compartment and a hutch, each of said hutches having rigid walls and thus a constant capacity and being provided with a discharge valve at the bottom, the said valve mechanism including the discharge ports being so constructed and arranged that when operated by its operating means an uninterrupted flow of liquid discharges from said pressure feed line, whereas periodical sudden pulsations are generated in each of the hutches.

3. A jig of the character described, comprising a jig compartment, a pressure liquid feed line, a valve mechanism associated with said feed line, a supply conduit directly connecting the said jig compartment to a discharge port of the said valve mechanism and means for constantly operating said valve mechanism, the said jig compartment comprising a perforated screen dividing same into a sluice compartment and a hutch, said hutch having rigid walls and thus a constant capacity and being provided with a discharge valve at the bottom and a suction conduit, the said valve mechanism being provided with a plurality of discharge ports including the aforementioned one and being so constructed and arranged that when operated by its operating means an uninterrupted flow of liquid discharges from said pressure feed line, whereas periodical sudden pulsations are generated in the said hutch.

4. A jig of the character described, comprising a plurality of jig compartments, a pressure liquid feed line, a valve mechanism associated with said feed line, supply conduits directly connecting each of the said jig compartments to a different one of a plurality of discharge ports of the said valve mechanism and means for constantly operating said valve mechanism, the said jig compartments each comprising a perforated screen dividing same into a sluice compartment and a hutch, each of said hutches having rigid walls and thus a constant capacity and being provided with a discharge at the bottom and a suction conduit, the said valve mechanism including the discharge ports being so constructed and arranged that when operated by its operating means an uninterrupted flow of liquid discharges from said pressure feed line, whereas periodical sudden pulsations are generated in each of the hutches.

5. A jig of the character described, comprising a jig compartment, a pressure liquid feed line, a valve mechanism associated with said feed line, a supply conduit directly connecting the said jig compartment to a discharge port of the said valve mechanism and means for constantly operating said valve mechanism, the said jig compartment comprising a perforated screen dividing same into a sluice compartment and a hutch, said hutch having rigid walls and thus a constant capacity and being provided with a discharge valve at the bottom and a suction conduit, the said valve mechanism being provided with a plurality of discharge ports including the aforementioned one and being so constructed and arranged that when operated by its operating means an uninterrupted flow of liquid discharges from said pressure feed line, whereas periodical sudden pulsations are generated in the said hutch, the said suction conduit being connected to driven controlling means timed relative to the said valve mechanism to produce alternately pulsations and suctions in the hutch.

6. A jig of the character described, comprising a plurality of jig compartments, a pressure liquid feed line, a valve mechanism associated with said feed line, supply conduits directly connecting each of the said jig compartments to a different one of a plurality of discharge ports of the said valve mechanism and means for constantly operating said valve mechanism, the said jig compartments each comprising a perforated screen dividing same into a sluice compartment and a hutch, each of said hutches having rigid walls and thus a constant capacity and being provided with a discharge at the bottom and a suction conduit, the said valve mechanism including the discharge ports being so constructed and arranged that when operated by its operating means an uninterrupted flow of liquid discharges from said pressure feed line, whereas periodical sudden pulsations are generated in each of the hutches, the suction conduits of the several hutches being connected to one driven suction controlling mechanism associated with and timed relative to the said valve mechanism to produce alternately pulsations and suctions in each of the hutches.

7. A jig of the character described, comprising a jig compartment, a pressure liquid feed line, a valve mechanism associated with said feed line, a supply conduit directly connecting the said jig compartment to a discharge port of the said valve mechanism and means for constantly operating said valve mechanism, the said jig compartment comprising a perforated screen dividing same into a sluice compartment and a hutch, said hutch having rigid walls and thus a constant capacity and being provided with a discharge valve at the bottom and a suction conduit, the said valve mechanism being provided with a plurality of discharge ports including the aforementioned one and being so constructed and arranged that when operated by its operating means an uninterrupted flow of liquid discharges from said pressure feed line, whereas periodical sudden pulsations are generated in the said hutch, the said suction conduit being connected to driven controlling means timed relative to the said valve mechanism to produce alternate and timed periods of pulsation, of rest and of suction in the hutch.

8. A jig of the character described, comprising a plurality of jig compartments, a pressure liquid feed line, a valve mechanism associated with said feed line, supply conduits directly connecting each of the said jig compartments to a different one of a plurality of discharge ports of the said valve mechanism and means for constantly operating said valve mechanism, the said jig compartments each comprising a perforated screen dividing same into rigid walls and thus a constant capacity and being provided with a discharge at the bottom and a suction conduit, the said valve mechanism including the discharge ports being so constructed and arranged that when operated by its operating means an uninterrupted flow of liquid discharges from said pressure feed line, whereas periodical sudden pulsations are generated in each of the hutches, the suction conduits of the several hutches being connected to one driven suction controlling mechanism associated with and timed relative to the said valve mechanism to produce alternate and timed periods of pulsation, of rest and of suction in each of the hutches.

9. A jig of the character described, comprising a jig compartment, a pressure liquid feed line, a suction liquid discharge line, a rotary valve mechanism associated with said feed lines, means for constantly operating said rotary valve mechanism, a pressure supply conduit and a suction conduit, both said conduits directly connecting the said jig compartment to the said rotary valve mechanism, the said jig compartment comprising a perforated screen dividing same into a sluice compartment and a hutch, said hutch having rigid walls and thus a constant capacity, the said rotary valve mechanism being provided with a plurality of pressure discharge ports, one of which is connected to the said pressure supply conduit and being so constructed and arranged that when operated by its operating means an uninterrupted flow of liquid discharges from said pressure liquid feed line, whereas periods of sudden pulsations alternate with periods of suction in said hutch.

10. A jig of the character described, comprising a plurality of jig compartments, a pressure liquid feed line, a suction liquid discharge line, a rotary valve mechanism associated with said feed lines, means for constantly operating said rotary valve mechanism, and a pressure supply and a suction conduit associated with each of the jig compartments, both said conduits directly connecting the said jig compartment to the rotary valve mechanism, each jig compartment comprising a perforated screen dividing same into a sluice compartment and a hutch, said hutch having rigid walls and thus a constant capacity, the said rotary valve mechanism being so constructed and arranged and connected to the several pressure supply and suction conduits, that when operated by its operating means an uninterrupted flow of liquid discharges from said pressure liquid feed line, whereas periods of sudden pulsations alternate with periods of suction in each of the hutches.

CORNELIS SCHOUTEN.